United States Patent [19]

Francisco, Jr.

[11] Patent Number: 5,623,103

[45] Date of Patent: Apr. 22, 1997

[54] METHOD AND APPARATUS FOR MEASURING FLUID FLOW CHARACTERISTICS

[75] Inventor: Edward E. Francisco, Jr., Valley, Ariz.

[73] Assignee: Calibron Systems, Inc., Scottsdale, Ariz.

[21] Appl. No.: 593,471

[22] Filed: Jan. 29, 1996

Related U.S. Application Data

[63] Continuation of Ser. No. 383,662, Feb. 2, 1995, abandoned, which is a continuation of Ser. No. 283,036, Jul. 29, 1994, abandoned.

[51] Int. Cl.$^6$ ........................................ G01F 1/82
[52] U.S. Cl. ........................................ 73/861.352
[58] Field of Search .............................. 73/54.28, 54.33, 73/54.34, 861.76, 861.78, 861.84, 861.352, 32 R

[56] References Cited

U.S. PATENT DOCUMENTS

| | | | |
|---|---|---|---|
| 2,943,487 | 7/1960 | Potter | 73/861.35 |
| 3,144,769 | 8/1964 | Francisco | 73/861.35 |
| 3,465,586 | 9/1969 | Johnston | 73/861.71 |
| 3,533,285 | 10/1970 | Dee | 73/861.35 |
| 3,575,052 | 4/1971 | Lenker | 73/861.35 |

*Primary Examiner*—Richard Chilcot
*Assistant Examiner*—Harshad Patel
*Attorney, Agent, or Firm*—Christie, Parker & Hale, LLP

[57] ABSTRACT

The parameters of flowing fluids are measured via the insertion of a two rotor assembly into the flowing fluid, the rotors adapted to rotate at different free running speeds, and being coupled such that the rotors share a common axis, and such that an angular displacement of one rotor relative to the other rotor applies a restoring torque to the other rotor, the restoring torque being dependent on the amount of angular displacement. The fluid flow induced angular displacement is related to the fluid mass flow rate, and the time interval between the passage of the rotors through a fixed reference plane extending radially from the common axis of the rotors is related to the density of the fluid. The apparatus incorporates rotors that are coupled by connecting them with a plurality of spring elements at two or more positions radially outward from the common axis of the rotors. The rotors may be oriented such that the rotor which is upstream in the flow is adapted to have a slower free running speed. The downstream rotor may be provided with means to move axially in response to the angular displacement induced shortening of the axial extension of the spring elements.

40 Claims, 5 Drawing Sheets

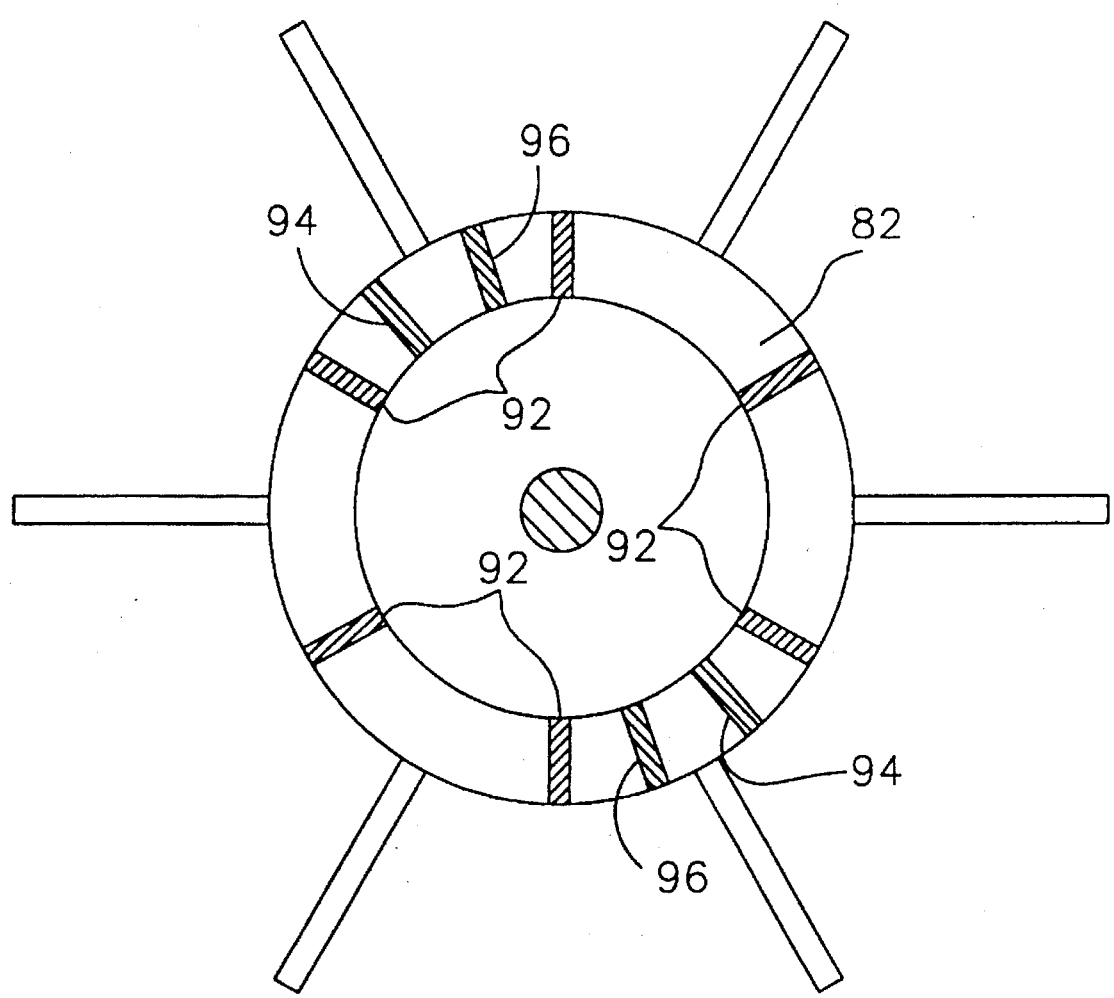

METHOD AND APPARATUS FOR MEASURING FLUID FLOW CHARACTERISTICS

CROSS-REFERENCE TO RELATED APPLICATION

This is a continuation of application Ser. No. 08/383,662, filed Feb. 2, 1995 now abandoned which is a continuation of Ser. No. 08/283,036, filed Jul. 29, 1994 also abandoned.

BACKGROUND OF THE INVENTION

This invention relates to measurement of fluid flow characteristics, and more particularly, to a method and apparatus for measuring the density and mass flow rate of a flowing fluid. It is well known that a bladed rotor will rotate at a speed which is directly related to the velocity of the fluid flowing past the rotor. The proportionality constant between the rotation rate of a particular rotor and the volume flow rate of the fluid is sometimes called the rotor's K-factor.

Although the rotation rate of a single rotor can be a measure of the volumetric flow rate of a fluid past the rotor, a measurement of mass flow rate or fluid density may be desired. To measure mass flow rate, an apparatus has been used whereby a bladed rotor is forced to rotate at a fixed rate, the torque required to make it do so being proportional to the rate at which fluid mass is passing the forced rotor. A different apparatus has also been developed, described in detail in U.S. Pat. Nos. 2,943,487 and 3,144,769. In general, the apparatus disclosed in these patents consists of two bladed rotors, one with a K-factor greater than the other, the two rotors being coupled together via a helical spring mechanism along the central axis. If the two rotors were not coupled, the one with the higher K-factor would turn faster than the one with the lower K-factor. The spring coupling, however, makes the high K-factor rotor induce a restoring torque on the low K-factor rotor, thereby pulling the low K-factor rotor around with it. The result is that both rotors turn at the same speed, but the rotor with the higher K-factor will lead the other rotor by a certain angular displacement, θ. It has been found that this angle is directly proportional to the momentum of the fluid passing the two rotor system. Being directly proportional to momentum, it is also directly proportional to mass flow rate. The larger the fluid momentum, the larger the phase angle, and the larger the induced torque on the low K-factor rotor.

A system which utilizes this relationship to measure mass flow produces an electrical impulse as each rotor passes through a fixed reference plane extending radially from the common axis of the rotors. These impulses are produced when a permanent magnet, such as a magnetized vane of a rotor, passes a pickup coil held in a fixed position adjacent to the rotor but external to the conduit in which the fluid is flowing. The angular placement of these pickup coils define the orientation of the fixed reference plane mentioned above. Since the higher K-factor rotor turns slightly ahead in phase from the rotor with the lower K-factor, the impulse from the higher K-factor rotor is produced earlier in time than the impulse from the lower K-factor rotor. This prior art teaches the measurement of mass flow rate by measuring solely the time period between the production of these two impulses.

Two problems have been found with this system. First, the time period between the two impulses above described is not a direct measure of the mass flow rate of the fluid. Second, coupling the rotors via a centrally located helical spring mechanism is mechanically complex and clumsy. This makes manufacturing difficult and expensive, and can lead to low reliability.

SUMMARY OF THE INVENTION

The invention relates generally to methods and apparatus for measuring the parameters of flowing fluids. A method for measuring the density of a fluid is disclosed comprising the steps of passing the fluid through a conduit, coupling first and second bladed rotors, one of which is adapted to rotate at a different free running speed than the other, such that the rotors share a common axis, and such that an angular displacement of one rotor relative to the other rotor applies a restoring torque to the other rotor, the restoring torque being dependent on the amount of angular displacement, inserting the coupled rotors into the conduit, determining the time interval between the passage of the rotors through a fixed reference plane extending radially from the common axis of the rotors, and finally relating the time interval to the density of the fluid.

The coupling step above may comprise connecting the rotors with a plurality of spring elements at two or more positions radially outward from the common axis of the rotors. The inserting step may comprise orienting the rotors in the conduit such that the rotor which is upstream in the flow is adapted to have a slower free running speed. The relating step may comprise multiplying the time interval by a calibrating constant, the product of the time interval and the calibrating constant being substantially equal to the fluid density.

A method for measuring the mass flow rate of a fluid is also disclosed, the method comprising the first three steps above, but then determining the angular displacement between the rotors, and relating the angular displacement to the mass flow rate of the fluid. In this case, the angular displacement may be determined via determining the time interval between the passage of the rotors through a fixed reference plane extending radially from the common axis of the rotors, also determining the time interval for the coupled rotor assembly to complete one rotation or a fraction thereof, and then dividing the time interval between the passage of the rotors through a fixed reference plane extending radially from the common axis of the rotors by the time period for the coupled rotor assembly to complete one rotation or a fraction thereof.

Mass flow can be related to these determinations by multiplying the quotient of the time interval between the passage of the rotors through a fixed reference plane extending radially from the common axis of the rotors and the time period for the coupled rotor assembly to complete one rotation or a fraction thereof by a calibrating constant, the product of the quotient and the calibrating constant being substantially equal to the mass flow rate of the fluid.

A device for measuring parameters of a fluid flowing from an upstream position to a downstream position through a conduit comprising the elements of a downstream bladed rotor, an upstream bladed rotor adapted to have a slower free running speed than the downstream rotor, means for coupling the rotors such that the rotors share a common axis, and such that an angular displacement of one rotor relative to the other rotor applies a restoring torque to the other rotor, the restoring torque being dependent on the amount of angular displacement.

Another device for measuring such parameters is disclosed wherein either the upstream or downstream rotors can be adapted for a slower free running speed but where the coupling means comprises a plurality of spring elements, one end of each spring element being attached to one rotor at positions radially outward from the common axis of the rotors, the other end of each spring element being attached to the other rotor at positions radially outward from the common axis of the rotors. In this apparatus means may be provided for allowing the downstream rotor to move axially in response to the angular displacement induced shortening of the axial extension of the spring elements.

Preferably the spring elements are flat, radially arranged springs. These flat springs serve as support beams for one of the rotors, which is cantilevered from the other rotor via the flat springs.

BRIEF DESCRIPTION OF THE DRAWINGS

The features of a specific embodiment of the best mode contemplated of carrying out the invention are illustrated in the drawings, in which:

FIG. 5 is a sectional view of the coupled rotary assembly taken through plane 5—5 in FIG. 4 (the curvature of the blades is not represented).

DETAILED DESCRIPTION OF THE PREFERRED EMBODIMENT

Figure 1:
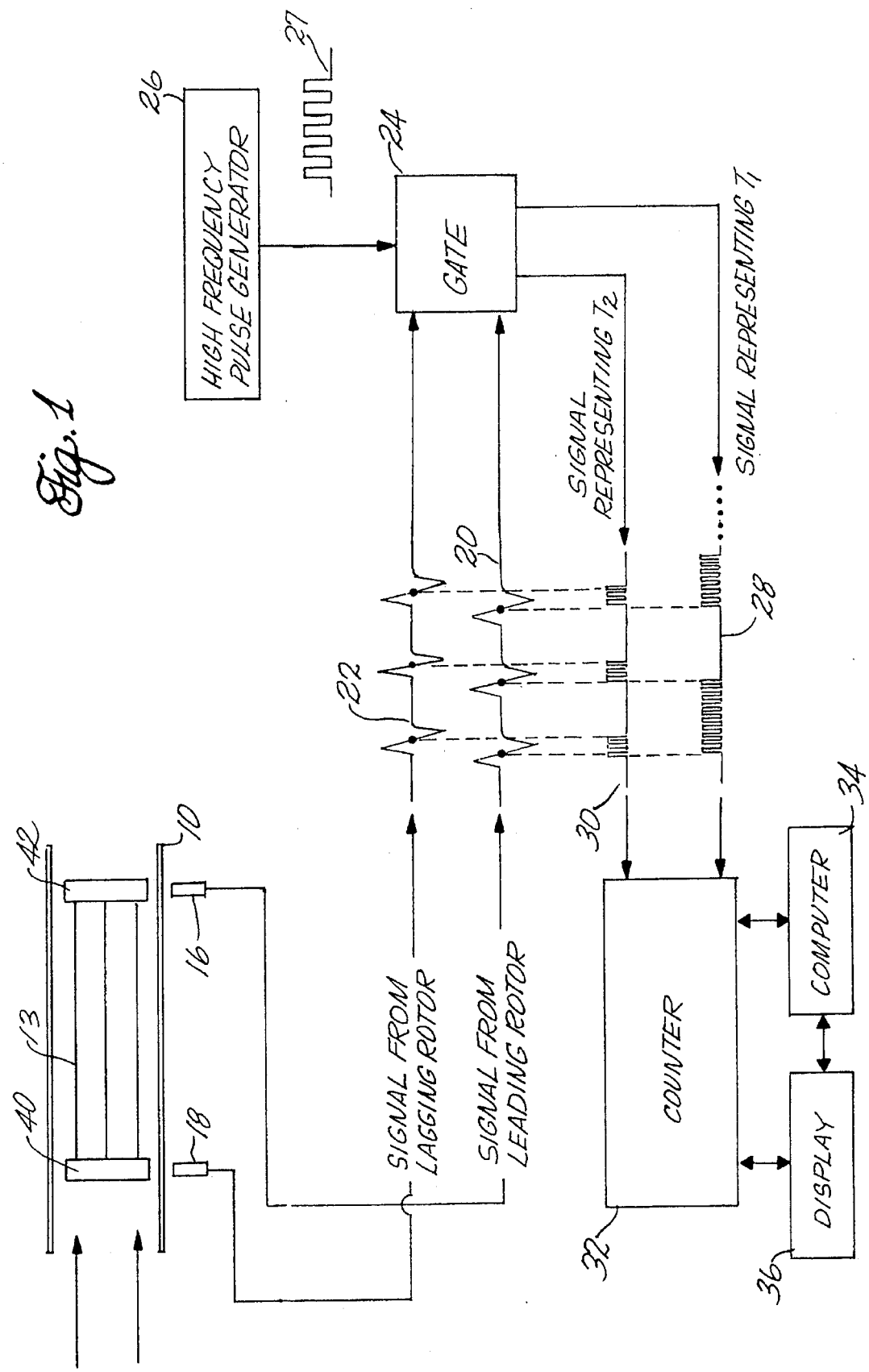
FIG. 1 is a schematic, partially block diagram of a fluid flow measurement system incorporating principles of the invention.

As illustrated schematically in FIG. 1, a conduit 10 is connected in a fluid flow line. Within conduit 10 are housed an upstream rotor 40, a downstream rotor 42, and a plurality (e.g. 3) of cylindrical rod like spring elements 13. Spring elements 13 are cylindrical rod-like members, i.e., they have a generally circular cross section. The blades of rotors 42 and 40 have different pitches so rotors 42 and 40 have different free running speeds and thus K-factors. In this embodiment, the upstream rotor has a lower K-factor than the downstream rotor. The two rotors are coupled by the spring elements which force both to rotate at the same speed, but which can bend and twist to allow the downstream rotor to advance ahead of the upstream rotor by a certain angular displacement which is proportional to the mass flow rate of the fluid past the rotor system. Downstream rotor 12 is driven by the fluid flowing through conduit 10 and upstream rotor 14 creates a drag on the rotation of downstream rotor 12, thereby creating the angular displacement between rotors 12 and 14. Spring elements 13 exert a restoring torque on rotors 42 and 40 that is proportional to the angular displacement.

Each rotor is further provided with some form of magnetization. This can be provided by attaching permanent magnets onto the rotor or vanes, or by using a magnetized material to manufacture the rotor or rotor vanes. This aspect of the specific embodiment is discussed further in conjunction with FIGS. 2 and 3. The important aspect is that the magnetic field outside the conduit and adjacent to each rotor is made to vary in magnitude (and perhaps also direction) depending on the angular position of each respective rotor.

Adjacent to each rotor but external to the conduit are two magnetic field sensitive pickoff devices 16, 18. These devices create electrical pulses in response to the changing magnetic field produced by the rotating rotors. Coils of varnished copper wire wrapped on an iron core are suitable, but other forms may be used, such as certain semiconductor based devices.

If the pickup devices are coils wrapped on iron cores, the output signal 20 produced by the rotation of the leading rotor is a periodic alternating current electrical pulse. Depending on the method of magnetizing the rotor, these impulses can occur either once or several times per rotor revolution. The output signal 22 produced by the rotation of the lagging rotor will be of the same frequency as that produced by the leading rotor, but the impulses corresponding to the equivalent angular orientation of the lagging rotor will be produced later in time from those produced by the leading rotor. Consequently, a similar series of pulses is produced by both rotors, with one set of signals out of phase from the other.

The magnetically induced signals 20, 22 from the outputs of the pickup coils are inputs to an electronic gate 24. Another input to the gate is a signal from a high frequency pulse generator 26, or "clock", which outputs a substantially continuous series of regular, high frequency electrical pulses 27. Good results can be achieved with the use of a 10 Mhz square wave, of approximately 5 V amplitude. Sources of such high frequency pulses are readily available commercially.

The gate has two outputs, both of which are either "gated on", in which case the output signal is approximately equal to the clock input or "gated off", in which case the output is approximately zero. The outputs are gated on or off in response to the alternating current signals produced by the pickup coils 16, 18.

Specifically, one gate output 30 is gated on for the duration of time between equivalent points on the pulse from the leading rotor and the next pulse from the lagging rotor. For example, gate electronics can be devised such that the gate is turned on by a negatively sloped zero-crossing of the pulse from the leading rotor, and turned off by the next occurrence of a negatively sloped zero-crossing of the pulse from the lagging rotor. A continuous series of pulse envelopes can be created by having the gate turn back on at the next negatively sloped zero-cross of the pulse from the leading rotor.

The other gate output 28 is gated on for the duration of time between equivalent points on the waveform from one rotor. Since both rotors rotate at the same angular speed, either the leading or lagging rotor can be used. Similar to the first gate output 30, a circuit such that the gate is turned on at a negatively sloped zero-crossing of one rotor, and turned off at the next occurring negative sloped zero-cross of that same rotor can be made. Once again, a continuous series of pulse envelopes is created by having the gate turn back on at the next negatively sloped zero-cross of the pulse from the same rotor.

In FIG. 1, the waveforms appearing at outputs 20, 22, 28, and 30 are represented as a function of time from left to right. It is assumed for the purpose of discussion that each pulse at outputs 20, 22 represents one complete rotation of the corresponding rotor, i.e. there is one magnet on each rotor. It is further assumed that pickoff devices 16 and 18 are aligned with each other, i.e. at the same angular position about the axis of rotors 42, 40, and the magnets are aligned with each other when rotors 42, 40 exert no torque on springs 13, i.e. when no fluid is flowing in conduit 10. This is hereafter called the "no torque" position of rotors 42, 40.

A counter 32 receives the pulse envelopes from the gate, and counts the number of pulses in each envelope. The count must be reset to zero during the quiescent period between envelopes in each signal. Due to the rotor speed, this cannot generally be done manually. The counter must be made to sense quiescent periods and reset itself, or alternatively, additional signals can be synchronized with the two spinning rotors, and used as reset signals for the counter.

The counter can also be attached to a computer 34 and a display 36. Prior to resetting, the counter could send the count to the computer, or to the display. Alternatively, the count could be converted to a time period using the known frequency of the clock, and displayed or stored as a time period rather than a count.

The fluid flowing in conduit 10 exerts a torque on springs 13 and causes rotors 42 and 40 to rotate relative to each other from the no torque position. The number of pulses in each signal envelope at output 30 represents the time interval from when one magnet passes its pickoff device and when the other magnet passes its pickoff device (hereafter called $T_2$). This time interval corresponds to the angular displacement, $\theta$, between rotors 42 and 40 away from the no torque position at the particular angular velocity of the coupled rotor assembly. The number of pulses in each envelope of signal 28 represents the period of rotation of the rotor assembly (hereafter called $T_1$). The following relationships hold:

$$T_2 \propto \text{fluid density} \quad (1)$$

$$1/T_1 \propto \text{fluid volumetric flow rate} \quad (2)$$

$$T_2/T_1 \propto \theta \propto \text{fluid mass flow rate} \quad (3)$$

Accordingly, the counts registered by the counter can be displayed, the times calculated, and the unknown fluid variables determined, once the device has been calibrated using fluids of known flow rates and densities to determine appropriate calibrating constants. In addition, it may be convenient to store the calibrating constants in a memory in the system, and the pulse counts, clock frequency, and constants can be used to calculate the fluid parameters. These can then be displayed directly or stored in the device.

The separate discussion of various components of the system is not meant to indicate that they are necessarily physically separate devices. The clock 26, gate 24, counter 32, display 36, and computer 34 can be combined in various combinations into single packages, integrated circuits, microprocessors, etc. The computer itself could be used to control the counter and gate in direct response to the rotor pulses.

Various other methods of electronically processing the alternating current signals to deduce the variables $T_1$ and $T_2$ can be devised by those skilled in the art. Other mechanical or optical methods can also be utilized to determine $T_1$, $T_2$, or the angular displacement, $\theta$, between the rotors. The preferred embodiment of the measurement system relies on electrical measurements to determine the time periods $T_1$ and $T_2$. The important thing, however, is that $T_1$, $T_2$, and the angular displacement, $\theta$, be determined in some manner, and be related to fluid density and mass flow rate.

It may also be noted that of the three fluid parameters, volumetric flow rate, density, and mass flow rate, only two are independent. That is, if two are known, the third can be calculated. Similarly, if any two of $T_1$, $T_2$, and the angular displacement, $\theta$, between rotors are known, the third can be calculated. Therefore, various related methods may be used to determine the desired fluid parameters. For example, it may be more direct to use a measurement of $T_2$ to derive density, but density may also be calculated from a measurement of $T_1$ and the angular displacement, $\theta$.

Figure 2:
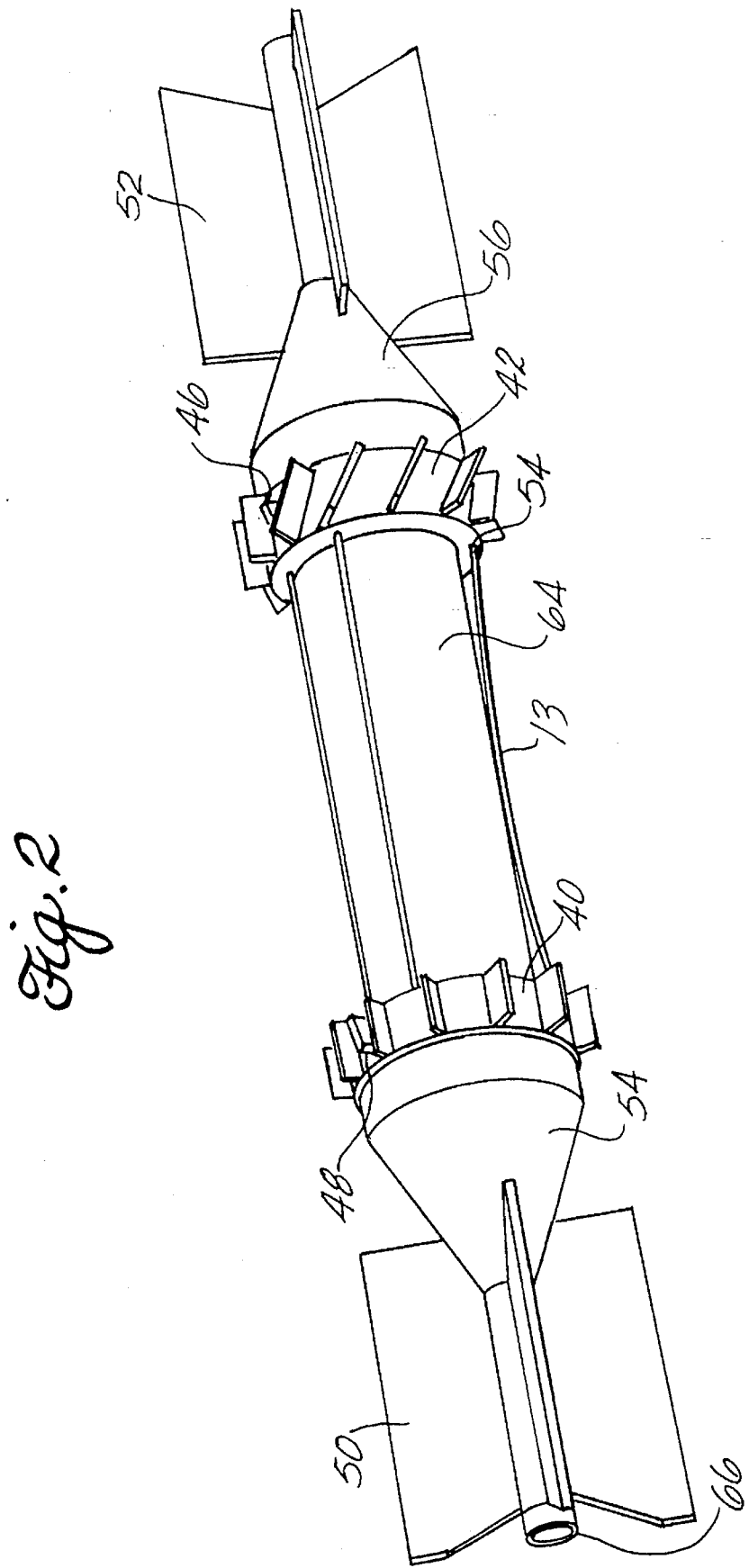
FIG. 2 is a perspective view of the coupled rotor assembly of the system represented in FIG. 1 without the conduit that houses the assembly.
Figure 3:
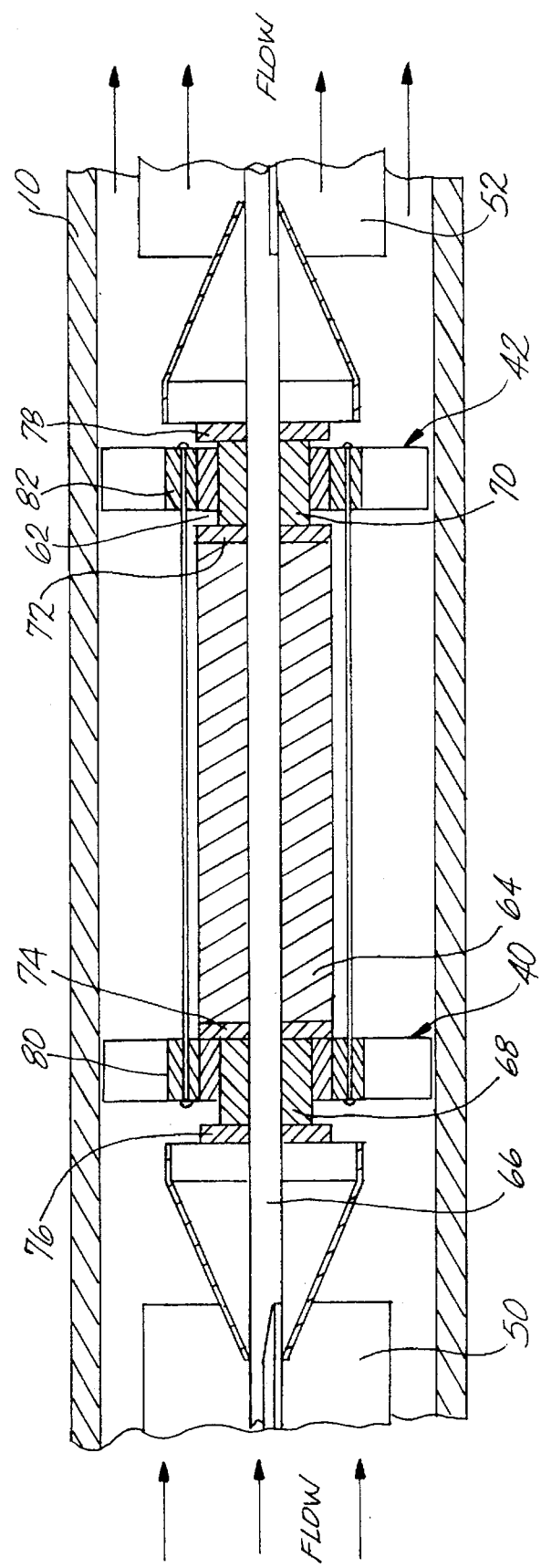
FIG. 3 is a side sectional view of one embodiment of the coupled rotor assembly of FIG. 2 installed in the conduit.

The rotor assembly itself, as mentioned above, comprises two rotors, yieldingly coupled by a plurality of spring elements mounted to an assembly fixed in the conduit. The two rotors are supported in the manner described below to rotate about a common axis. FIGS. 2 and 3 illustrate the details of a specific embodiment of this coupled dual rotor assembly. This embodiment comprises a stationary central shaft 66, onto which the other components of the assembly are mounted. Central shaft 66 passes through hubs 80, 82 of the rotors. This central shaft is small in diameter compared to the conduit and is aligned with the common axis. As the fluid passes downstream from one side of the assembly to the other, it first passes four flow straightening vanes 50, fixed to the upstream end of the central shaft. They are each spaced approximately 90 degrees apart, and extend out from the central shaft, approximately to the inner conduit wall. Downstream and adjacent to vanes 50 is a radially symmetrical conical flow spreader 54, fixed to the central shaft 66, with its smaller end upstream. The larger end of the spreader 54 is approximately equal to the diameter of the upstream rotor hub 80. The fluid next encounters the coupled rotors themselves, each mounted to the central shaft 66 on a journal bearing 68, 70. The upstream rotor 40 is straight bladed, that is, the blades are parallel with the fluid flow. The upstream straight bladed rotor is coupled to an angle bladed downstream rotor 42, via three thin and flexible cylindrical steel spring elements 13. The spring elements are of substantially equal size and weight, and are distributed evenly about the common axis at the same radial distance such that the system is substantially balanced when rotating. The spring elements are flexible enough to bend and/or twist in response to flow induced rotation, such that the angle bladed rotor 42 can advance ahead of the straight bladed rotor 40, inducing a restoring torque on the straight bladed rotor, and forcing it to rotate at the same rotation rate in response to the flow. The spring elements 13 may be attached to the rotors in several ways. Preferably, they are permanently fixed to the rotor hubs 80, 82 with spot welds. Alternatively, the spring elements 13 may be threaded, and inserted through appropriately positioned holes in the rotor hubs 80, 82, held in place with locking nuts. Since the rotors 40, 42 are limited in their axial motion (a feature discussed in more detail below), it is not essential that the spring elements 13 be fixed to the hubs 80, 82. The spring elements 13 could be inserted through appropriately positioned holes in the rotor hubs 80, 82, and as long as their length is greater than the allowed axial separation of the rotors 40, 42, they will remain in place in the holes, even though not permanently fixed to the rotor hubs 80, 82. It is desirable that the relationship between torque exerted on the rotors and the angular displacement, $\theta$, be as close to linear as possible over a large angular displacement. A multiple spring element system such as the one described has favorable characteristics in this regard.

If not axially restrained, the flowing fluid will push the coupled rotors downstream. Furthermore, when the spring elements bend, the axial separation between the rotors decreases. Therefore, the rotors must be restrained from moving downstream, and at the same time be allowed to move axially relative to one another.

FIG. 3 illustrates the restraints on axial rotor motion and the bearing assemblies. Rotor 40 is mounted for rotation on shaft 66 by a journal bearing 68. Journal bearing 68 is restrained for limited axial motion by stops 74 and 76. Rotor 42 is mounted for rotation on shaft 66 by a journal bearing 70. Journal bearing 70 is restrained for limited axial motion by stops 72 and 78. Normally, when fluid is flowing, the upstream rotor is pushed against downstream stop 74, which can be provided by the upstream end of a stationary sleeve 64, fixed to the central shaft 66. Stops 72 and 74 are incorporated into the ends of sleeve 64. The sleeve 64 has a length somewhat less than the spring elements coupling the rotors, and a diameter somewhat less than the outer diameter of the rotor hubs 80, 82. The spring elements rotate around the sleeve 64, radially outward from the sleeve surface. The downstream stop 74 may in the alternative simply be a spring clip secured in a groove on the central shaft.

The downstream rotor is prevented from moving axially downstream by the spring elements connecting it to the upstream rotor. Because the upstream rotor is forced against the upstream end of the sleeve 64, the sleeve does not extend all the way to the downstream rotor. There is, therefore, some space 62 between the stop 72 and the downstream rotor. Therefore, the downstream rotor hub 82 is able to slide upstream along the downstream bearing 70 when the spring elements decrease in axial extension and pull upstream on the downstream rotor.

It may be noted that if the spring elements 13 are not permanently fixed to the rotor hubs 80, 82, the axial distance between the two rotors 40, 42, need not necessarily decrease. For instance, if suitably long spring elements 13 are inserted through holes in the rotor hubs 80, 82 without permanent fixing, the shortening of their axial extension can be accommodated by a shift in the position of the spring elements relative to the holes, rather than a shift in the position of the rotor 42 relative to the rotor 40. In this case, both the two rotors 40, 42 could be ball bearing type, permanently fixed to the central shaft 66.

Of course, the apparatus as a whole must be prevented from moving downstream with the fluid as well. This can be accomplished in many well known ways. For example, the central shaft 66 can be bolted or screwed to flanges inside the conduit. Also, the vanes 50, 52 can be restrained with spring clips seated in grooves provided on the inside surface of the conduit.

Two important features are thus provided by the invention. First, an upstream rotor which is prevented from moving downstream. Second, a downstream rotor which is able to move upstream in response to the flow induced reduction in axial extension of the spring elements.

If the upstream rotor bearing is a journal type, as shown, the first feature can be accomplished with a downstream stop such as a spring clip. Alternatively, the upstream rotor hub 80 could be a ball bearing type, pressed onto the central shaft, prevented from moving either upstream or downstream.

Figure 4:
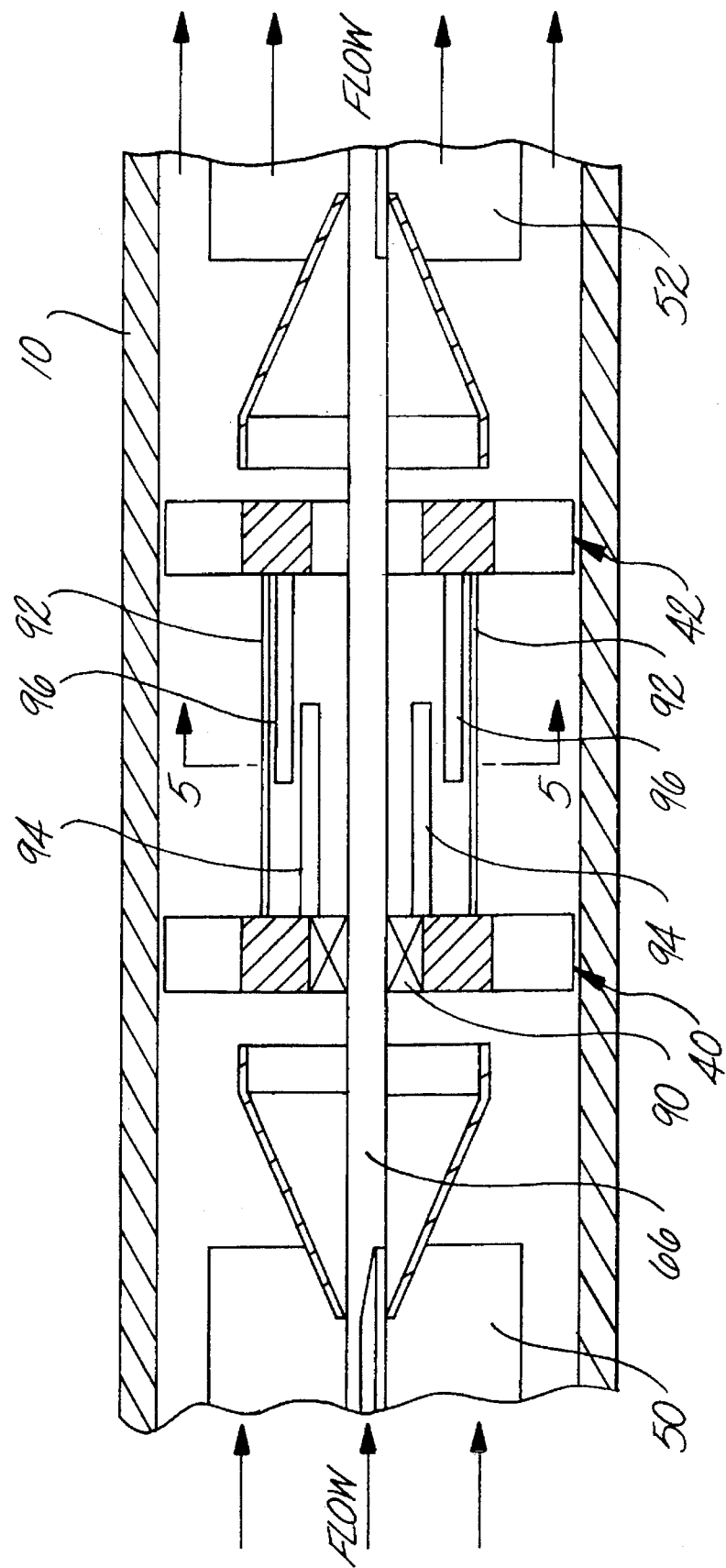
FIG. 4 is a side sectional view of another embodiment of the coupled rotor assembly of FIG. 2 installed in the conduit.

Another embodiment of the invention is shown in FIGS. 4 and 5. In this embodiment rotor hub 80 is mounted for rotation on shaft 66 by a ball bearing assembly 90 pressed onto shaft 66 so as to be axially fixed, i.e., fixed against either upstream or downstream motion. Hub 80 is attached to hub 82 by a plurality of (e.g. six) oblong, somewhat flat and thin springs 92, instead of rod shaped spring elements 13, distributed at the same radial distance from the axis of rotation of rotors 12 and 14. As depicted in FIG. 5, springs 92 preferably have a generally rectangular cross section and the long dimension is radially aligned with the axis of rotation of rotors 12 and 14 and hubs 80 and 82. In this embodiment, hub 82 is unconnected to and in fact, although surrounding, spaced away from shaft 66. As a result, downstream rotor 42 is cantilevered from upstream rotor 40, so springs 92 serve as support beams to maintain rotor 42 in axial alignment with rotor 40 and shaft 66. Thus, no bearings are provided to support downstream rotor 42 on shaft 66. This reduces the friction acting on the coupled rotor assembly and reduces maintenance requirements because of the elimination of bearings for downstream rotor 42. (Although downstream rotor 42 is cantilevered, upstream rotor 40 could be cantilevered instead.) As in the embodiment of FIGS. 2 and 3, springs 92 are distributed evenly about the common axis, i.e., the angular spacing circumferentially between springs 92 is the same. Springs 92 are also spaced the same radial distance from the common axis.

To prevent overrotation of springs 92, a set of two or more rigid fingers 94 extend downstream from hub 80, and a set of two or more rigid fingers 96 extend upstream from hub 82. Fingers 94 and 96 are all spaced the same radial distance from the axis of shaft 66 so they move along the same circumferential path. Fingers 94 are paired with respective fingers 96 so one finger of each pair is angularly displaced from the other finger or the pair when rotors 40 and 42 are at rest. When rotors 40 and 42 rotate as the flow rate of the fluid passing through conduit 10 increases, the angular displacement between fingers 94 and 96 decreases. When the maximum flow rate is attained, fingers 94 and 96 contact each other to limit further rotation and, thus, torsional force on springs 92.

It is not necessary for either rotor to be straight bladed. All that is required is that one rotor have a lower free K-factor than the other. It is desirable to place the lower K-factor rotor upstream in the flow from the higher K-factor rotor. This is because the resultant K-factor of the coupled two rotor assembly is much greater when this is the case. The described coupled rotor assembly has a K-factor almost four times higher when the low K-factor rotor (the "drag" rotor) is placed upstream rather than downstream. This occurs because the rotation of the drag rotor imparts a rotational velocity to the fluid in the same direction that the high K-factor rotor (the "drive" rotor) is turning.

Another benefit to this geometry is that the angular displacement, θ, produced by a given mass flow can be affected by increasing or reducing the amount of drag that the drag rotor creates without greatly changing the K-factor of the assembly.

Fluid coupling between the two rotors is maximized when they are positioned close together, although their proximity is limited by the ability of the spring elements to bend and twist to a suitable extent. In the described embodiment, the rotors are separated axially by approximately twice their diameter.

To produce the magnetic fields sensed by the sensing devices 16, 18, the embodiment provides permanent magnets 46, 48, pressed into rotor hubs 80, 82, respectively, between the blades as shown.

After flowing past the coupled rotors, the fluid passes another flow spreader 56, substantially identical to the upstream flow spreader, but with the smaller end pointed downstream. Finally, another set of flow straightening fins 52 are encountered, substantially identical to the upstream fins 50 described above.

It should be noted that the specific apparatus described is a preferred but not necessary apparatus for practicing the invention. Any yieldingly coupled dual rotor assembly may be used to measure the density of a flowing fluid via a determination of the time interval between the passage of the two rotors passed a fixed reference plane. In particular, the coupling mechanisms described in U.S. Pat. Nos. 2,943,487 and 3,144,769 are suitable.

The described embodiment of the invention is only considered to be preferred and illustrative of the inventive concept; the scope of the invention is not to be restricted to such embodiment. Various and numerous other arrangements may be devised by one skilled in the art without departing from the spirit and scope of this invention.

What is claimed is:

1. A method for measuring the density of a fluid comprising the following steps:
   (1) passing the fluid through a conduit;
   (2) coupling first and second bladed rotors, one of which rotates at a different free running speed than the other, such that the rotors share a common axis, and such that an angular displacement of one rotor relative to the other rotor applies a restoring torque to the other rotor, the restoring torque being dependent on the amount of angular displacement;
   (3) inserting the coupled rotors into the conduit;
   (4) determining the time interval between the passage of the rotors through a fixed reference plane extending radially from the common axis of the rotors; and
   (5) multiplying the time interval by a calibrating constant, the product of the time interval and the calibrating constant being substantially equal to the fluid density.

2. The method of claim 1 in which the coupling step comprises connecting the rotors with a plurality of spring elements that are aligned parallel to the direction of the passing fluid at two or more positions radially outward from the common axis of the rotors.

3. The method of claim 1 in which the inserting step comprises orienting the rotors in the conduit such that the rotor which is upstream in the flow has a slower free running speed than the rotor which is downstream in the flow.

4. A method for measuring the mass flow rate of a fluid comprising the following steps:
   (1) passing the fluid through a conduit;
   (2) coupling first and second bladed rotors, one of which rotates at a different free running speed than the other, to form a rotor assembly such that the rotors share a common axis, and such that an angular displacement of one rotor relative to the other rotor applies a restoring torque to the other rotor, the restoring torque being dependent upon the amount of angular displacement;
   (3) inserting the coupled rotors into the conduit;
   (4) determining the time interval between the passage of the rotors through a fixed reference plane extending radially from the common axis of the rotors;
   (5) determining the time interval for the coupled rotor assembly to complete one rotation or a fraction thereof; and
   (6) dividing the time interval between the passage of the rotors through a fixed reference plane extending radially from the common axis of the rotors by the time period for the coupled rotor assembly to complete one rotation or a fraction thereof to relate the angular displacement to the mass flow rate of the fluid.

5. The method of claim 4 in which the coupling step comprises connecting the rotors with a plurality of spring elements that are aligned parallel to the direction of the passing fluid at two or more positions radially outward from the common axis of the rotors.

6. The method of claim 4 in which the inserting step comprises orienting the rotors in the conduit such that the rotor which is upstream in the flow has a slower free running speed.

7. The method of claim 4, wherein additionally comprising multiplying the quotient of the time interval between the passage of the rotors through a fixed reference plane extending radially from the common axis of the rotors and the time period for the coupled rotor assembly to complete one rotation or a fraction thereof by a calibrating constant, the product of the quotient and the calibrating constant being substantially equal to the mass flow rate of the fluid.

8. A device for measuring parameters of a fluid flowing from an upstream position to a downstream position through a conduit comprising the following elements:
   (1) a downstream bladed rotor;
   (2) an upstream bladed rotor having a different free running speed than the downstream rotor;
   (3) means for coupling the rotors such that the rotors share a common axis, and such that an angular displacement of one rotor relative to the other rotor applies a restoring torque to the other rotor, the restoring torque being dependent on the amount of angular displacement;
   (4) means for measuring the angular displacement; and
   (5) means for multiplying the measured angular displacement by a calibrating constant, the product of the measured angular displacement and the calibrating constant being substantially equal to the mass flow rate of the fluid.

9. The device of claim 8, in which the rotors rotate about a common axis and the coupling means comprises a plurality of springs connecting the rotors, the springs having an oblong cross section with a long dimension radially aligned with the common axis.

10. A device for measuring parameters of a fluid flowing from an upstream position to a downstream position through a conduit comprising the following elements:
    (1) a downstream bladed rotor;
    (2) an upstream bladed rotor;
    (3) means for coupling the rotors such that the rotors share a common axis, and such that an angular displacement of one rotor relative to the other rotor applies a restoring torque to the other rotor, the restoring torque being dependent on the amount of angular displacement, such means comprising a plurality of spring elements, one end of each spring element being attached to one rotor at positions radially outward from the common axis of the rotors, the other end of each spring element being attached to the other rotor at positions radially outward from the common axis of the rotors, such that the spring elements are aligned parallel to the direction of fluid flow;
    (4) means for determining the time interval between the passage of the rotors through a fixed reference plane extending radially from the common axis of the rotors; and
    (5) means for multiplying the time interval by a calibrating constant, the product of the time constant and the calibrating constant being substantially equal to the fluid density.

11. The device of claim 10 wherein means are provided for allowing the downstream rotor to move axially in response to shortening of the axial extension of the spring elements, induced by angular displacement.

12. The device of claim 11, in which the spring elements each have an oblong cross section with a long dimension radially aligned with the common axis.

13. The device of claim 12, in which the upstream rotor is designed to have a slower free running speed than the downstream rotor.

14. The device of claim 13, additionally comprising means for generating a first electrical signal that is representative of the relative angular displacement between the rotors.

15. The device of claim 14, additionally comprising display means responsive to the first electrical signal, the display means being calibrated to display the density of the fluid.

16. The device of claim 15, additionally comprising means for generating a second electrical signal representative of the rotational period of the rotors.

17. The device of claim 16, additionally comprising means for generating a third electrical signal representative of the first signal divided by the second signal.

18. The device of claim 17, in which the display means is also calibrated to display the mass flow rate of the fluid.

19. The device of claim 10, additionally comprising annular hubs on which the rotors are mounted and a support shaft passing through the hubs in alignment with the common axis.

20. The device of claim 19, in which the springs are connected to the hubs.

21. The device of claim 20, in which the springs are spaced the same radial distance from the common axis.

22. The device of claim 21, in which the springs are distributed evenly around the common axis.

23. The device of claim 22, additionally comprising a bearing rotatably mounting one of the rotors to the shaft.

24. The device of claim 23, additionally comprising a bearing rotatably mounting the other rotor to the shaft.

25. The device of claim 23, in which the other rotor is spaced from the shaft and cantilevered from said one rotor.

26. The device of claim 25, in which the one rotor is the upstream rotor.

27. A device for measuring parameters of a fluid flowing from an upstream position to a downstream position through a conduit comprising the following elements:

(1) a downstream bladed rotor;

(2) an upstream bladed rotor adapted to have a different free running speed than the downstream rotor;

(3) means for coupling the rotors to form a rotor assembly such that the rotors share a common axis and such that an angular displacement of one rotor relative to the other rotor applies a restoring torque to the other rotor, the restoring torque being dependent on the amount of angular displacement;

(4) means for generating a first signal representative of the time interval between the passage of the rotors through a fixed reference plane extending radially from the common axis of the rotors;

(5) means for generating a second signal representative of the time interval for the coupled rotor assembly to complete one rotation or a fraction thereof; and (6) means for generating a third signal representative of the quotient of the time interval between the passage of the rotors through a fixed reference plane extending radially from the axis of the rotors divided by the time period of the rotor assembly to complete one rotation or a fraction thereof.

28. The device of claim 27, in which the third signal is representative of the mass flow rate of the fluid.

29. The device of claim 28, in which the rotors are adapted to rotate about a common axis and the coupling means comprises a plurality of springs connecting the rotors, the springs having an oblong cross section with a long dimension radially aligned with the common axis.

30. The device of claim 29, additionally comprising annular hubs on which the rotors are mounted and a support shaft passing through the hubs is aligned with the common axis.

31. The device of claim 30, in which the springs are connected to the hubs.

32. The device of claim 31, in which the springs are spaced the same radial distance from the common axis.

33. The device of claim 32, in which the springs are distributed evenly around the common axis.

34. The device of claim 33, additionally comprising a bearing rotatably mounting one of the rotors to the shaft.

35. The device of claim 34, additionally comprising a bearing rotatably mounting the other rotor to the shaft.

36. The device of claim 35, in which the other rotor is spaced from the shaft and cantilevered from the one rotor.

37. The device of claim 36, in which the one rotor is the upstream rotor.

38. The device of claim 27, additionally comprising means responsive to the third signal for displaying the mass flow rate of the fluid.

39. A device for measuring parameters of a fluid flowing from an upstream position to a downstream position through a conduit comprising the following elements:

(1) a downstream bladed rotor;

(2) an upstream bladed rotor adapted to have a different free running speed than the downstream rotor;

(3) means for coupling the rotors to form a rotor assembly such that the rotors share a common axis and such that an angular displacement of one rotor relative to the other rotor applies a restoring torque to the other rotor, the restoring torque being dependent on the amount of angular displacement;

(4) means for generating a first signal representative of the time interval between the passage of the rotors through a fixed reference plane extending radially from the common axis of the rotors; and (5) means for generating a second signal representative of the product of the first signal and a calibrating constant, the calibrating constant being such that the product represents the fluid density.

40. The device of claim 39, additionally comprising means responsive to the second signal for displaying the fluid density.

* * * * *